(12) United States Patent
Hally

(10) Patent No.: US 7,814,857 B2
(45) Date of Patent: Oct. 19, 2010

(54) CABLE CONTROL APPARATUS

(76) Inventor: Joseph Patrick Hally, 200 Trites Ave., Norwood, PA (US) 19074

( * ) Notice: Subject to any disclaimer, the term of this patent is extended or adjusted under 35 U.S.C. 154(b) by 0 days.

(21) Appl. No.: 12/472,975

(22) Filed: May 27, 2009

(65) Prior Publication Data

US 2009/0321695 A1    Dec. 31, 2009

Related U.S. Application Data

(63) Continuation of application No. 11/845,248, filed on Aug. 27, 2007, now abandoned, and a continuation-in-part of application No. 11/845,245, filed on Aug. 27, 2007, now abandoned.

(60) Provisional application No. 60/823,688, filed on Aug. 28, 2006.

(51) Int. Cl.
*A01M 29/00* (2006.01)
(52) U.S. Cl. .................... 116/22 A; 116/22 R; 43/2
(58) Field of Classification Search ............ 116/22 A, 116/22 R; 43/1–3; 446/30–31, 228–229; 119/713; 340/573.2
See application file for complete search history.

(56) References Cited

U.S. PATENT DOCUMENTS

| | | | |
|---|---|---|---|
| 2,357,900 A | 9/1944 | Lenhardt | |
| 2,731,937 A | 1/1956 | Rhodes | |
| 2,788,762 A | 4/1957 | Wright | |
| 4,109,605 A | 8/1978 | Bachli | |
| 4,910,500 A | 3/1990 | Carr | |
| 5,956,880 A | 9/1999 | Sugimoto | |
| 5,977,866 A | 11/1999 | Joseph et al. | |
| 6,285,630 B1 | 9/2001 | Jan | |
| 6,357,159 B1 | 3/2002 | Bowling | |
| 6,622,634 B2 * | 9/2003 | Cylvick | ............... 104/53 |
| 6,742,470 B2 | 6/2004 | Keithly | |
| 6,742,471 B2 | 6/2004 | Laidler | |
| 6,907,688 B2 | 6/2005 | Brint | |
| 7,637,213 B2 * | 12/2009 | Cylvick | ............... 104/112 |

(Continued)

OTHER PUBLICATIONS

Office Action dated May 29, 2008 for U.S. Appl. No. 11/845,248.

(Continued)

*Primary Examiner*—R. A. Smith
*Assistant Examiner*—Tania C Courson
(74) *Attorney, Agent, or Firm*—Schnader Harrison Segal & Lewis LLP

(57) ABSTRACT

A cable control apparatus comprises a carrier disposed on a loop of cable; one or more trigger points disposed on the loop of cable; a control mechanism to control movement of the loop of cable, the control mechanism comprising a plurality of sensors to sense the one or more trigger points, and a motor to impart movement to the loop of cable. The sensors are functionally connected to the motor, and the motor has at least two wheels about which the loop of cable is wrapped a plurality of times. A first sensor of the plurality of sensors stops the motor and reverses the direction of the cable to bring the carrier to a base location; a second sensor of the plurality of sensors stops the motor when the carrier reaches the base location; and a third sensor of the plurality of sensors restarts the motor. In one embodiment, the carrier takes the form of a predator for frightening animals.

17 Claims, 6 Drawing Sheets

U.S. PATENT DOCUMENTS

| | | | |
|---|---|---|---|
| 2004/0035351 | A1 | 2/2004 | Keithly |
| 2004/0255837 | A1 | 12/2004 | Donoho |
| 2006/0288901 | A1* | 12/2006 | Cylvick .................. 104/112 |
| 2007/0221115 | A1 | 9/2007 | Pollard et al. |
| 2008/0047191 | A1 | 2/2008 | Hally |
| 2008/0047782 | A1* | 2/2008 | Hally .................. 187/256 |
| 2008/0178791 | A1 | 7/2008 | Sullivan |
| 2008/0210153 | A1 | 9/2008 | Alvarado |
| 2009/0014259 | A1* | 1/2009 | Cylvick .................. 188/42 |
| 2009/0084018 | A1* | 4/2009 | Elliott et al. .................. 43/3 |
| 2009/0094877 | A1* | 4/2009 | Smith .................. 43/3 |
| 2009/0260274 | A1* | 10/2009 | Rogers .................. 43/2 |
| 2009/0272020 | A1* | 11/2009 | Bill .................. 43/3 |
| 2010/0011650 | A1* | 1/2010 | Leonards, Sr. .................. 43/3 |
| 2010/0058974 | A1* | 3/2010 | Sullivan .................. 116/22 A |
| 2010/0071248 | A1* | 3/2010 | Brestal et al. .................. 43/3 |

OTHER PUBLICATIONS

Response to May 29, 2008 Office Action for U.S. Appl. No. 11/845,248.

Terminal Disclaimer dated Oct. 29, 2008 for U.S. Appl. No. 11/845,248.

Final Office Action dated Jan. 27, 2009 for U.S. Appl. No. 11/845,248.

Examiner Interview Summary dated Mar. 5, 2009 for U.S. Appl. No. 11/845,248.

Examiner Interview Summary dated Mar. 24, 2009 for U.S. Appl. No. 11/845,248.

Office Action dated May 29, 2008 for U.S. Appl. No. 11/845,245.

Response to May 29, 2008 Office Action for U.S. Appl. No. 11/845,245.

Terminal Disclaimer dated Oct. 29, 2008 for U.S. Appl. No. 11/845,245.

Final Office Action dated Jan. 27, 2009 for U.S. Appl. No. 11/845,245.

Notice of Publication dated Feb. 28, 2008 for U.S. Appl. No. 11/845,245.

Notice of Publication dated Feb. 28, 2008 for U.S. Appl. No. 11/845,248.

* cited by examiner

CABLE CONTROL APPARATUS

This application is a continuation of U.S. application Ser. No. 11/845,245, filed Aug. 27, 2007 and entitled Wildlife Control Apparatus, and U.S. application Ser. No. 11/845,248, also filed Aug. 27, 2007 and entitled Cable Control Apparatus. This application likewise claims the benefit of U.S. provisional application Ser. No. 60/823,688, filed Aug. 28, 2006 and entitled Wildlife Control Apparatus. Application Ser. No. 11/845,245 and Ser. No. 11/845,438 are based on, and claim the benefit of, U.S. provisional application Ser. No. 60/823,688, filed Aug. 28, 2006 and entitled Wildlife Control Apparatus.

BACKGROUND OF THE INVENTION

Cables are used to transport various items back and forth between two or more points. Generally, the cable is disposed in a closed-loop and has an attachment mechanism to affix an object, such as a container or platform for movement of items, from one point to another.

Many types of cables, such as ropes, behave differently as the environment changes. For example, a rope may be longer when wet than when dry. Therefore, a rope exposed to rain will have a different length as compared to its length when the weather is dry.

Many cable systems rely on the cable length to determine when to stop or start the system. If the cable length varies, the stopping and starting points can be affected. Accordingly, there is a need for a system that is not significantly adversely affected by changes in the cable length.

SUMMARY OF THE INVENTION

Various embodiments of a cable control apparatus are disclosed. A carrier and one or more trigger points are disposed on a loop of cable to which motion is imparted by a motor. The interface between the motor and cable includes at least two wheels around which the cable is wrapped a plurality of times, preferably in a figure-8 fashion. This apparatus provides control of the location of the carrier due to the combination of the interface between the motor and the cable, which allows little or no slippage between the motor and the cable, and the use of multiple trigger points on the cable. A control mechanism controls movement of the cable and has a plurality of sensors to sense the trigger points, thus controlling the motor. A first sensor stops the motor and reverses the direction of the cable to bring the carrier to a base location, a second sensor stops the motor when the carrier reaches the base location, and a third sensor restarts the motor. The apparatus can be controlled remotely, including over the Internet, which includes reprogramming and troubleshooting capabilities.

DESCRIPTION OF THE DRAWINGS

The invention is best understood from the following detailed description when read with the accompanying drawings.

DETAILED DESCRIPTION OF THE INVENTION

Illustrative embodiments of the present invention include a cable control system and method. Illustrative embodiments of the present invention also include a method and apparatus to rid areas of unwanted wildlife.

Figure 1:
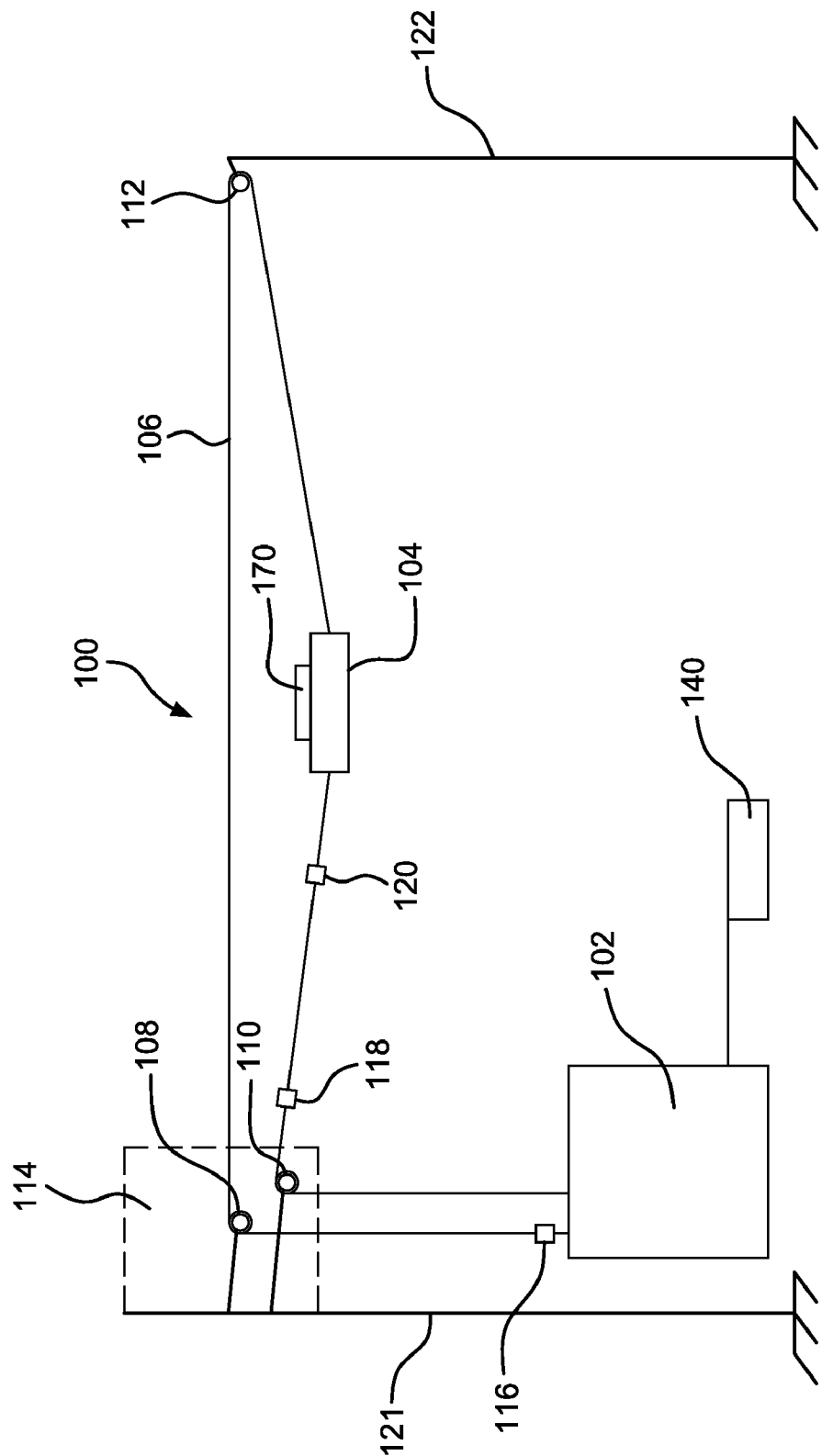
FIG. 1 depicts a cable control apparatus according to an illustrative embodiment of the invention.

FIG. 1 depicts a cable control apparatus 100 according to an illustrative embodiment of the invention. A control box 102 houses an electronic control panel, sensors and pulleys and/or wheels that control and guide carrier 104 across an area.

Figure 2:
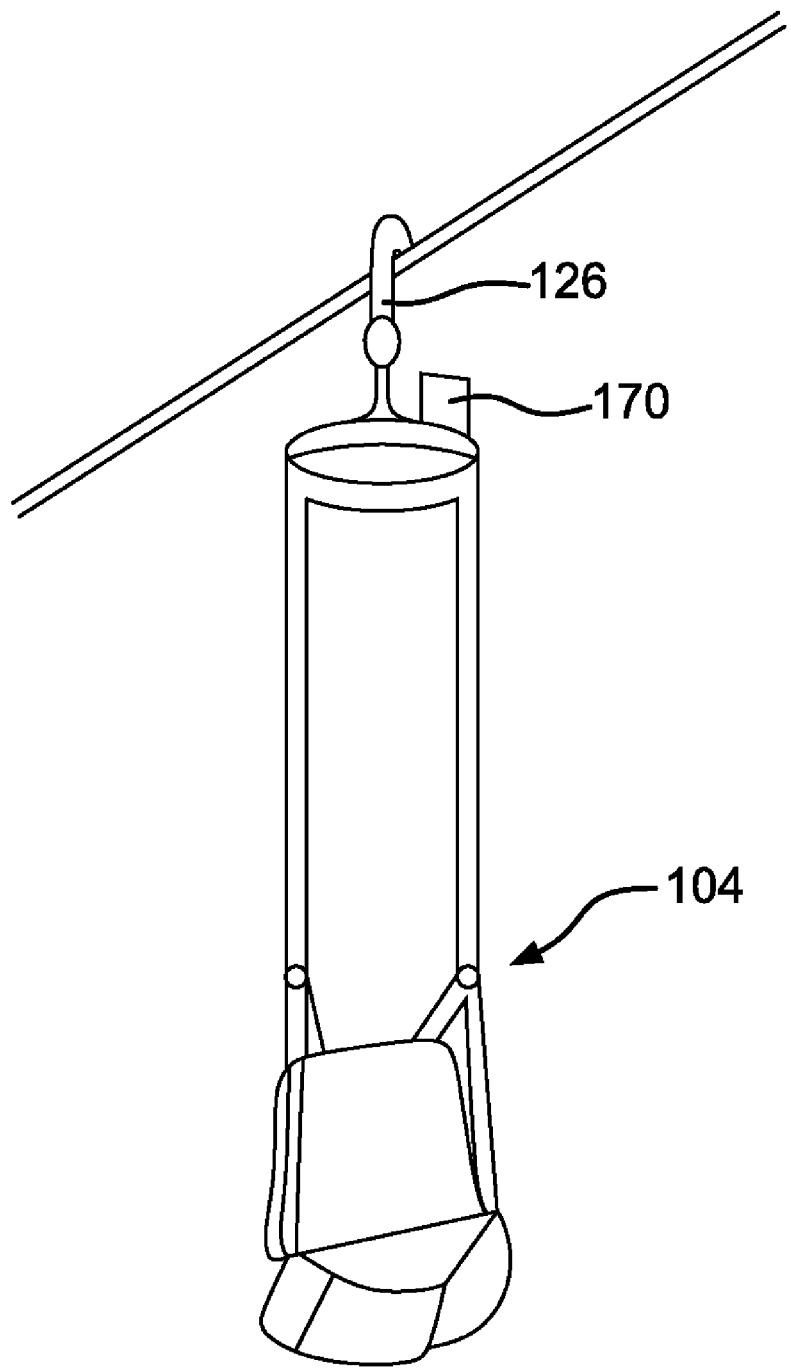
FIG. 2 depicts a carrier according to an illustrative embodiment of the invention.

FIG. 2 depicts an illustrative carrier. The carrier may be an apparatus that can hold or otherwise accommodate an item to be transported, or it may be an attachment mechanism to attach an item to the cable. Items to be transported may also be attached directly to the cable, or the attachment device may be a component of the transportable item. An illustrative attachment line 126 connects carrier 104 to cable 106 at attachment point 136. Solar powered sound device 170 is attached to carrier 104. Carrier 104 can be used to hold an inanimate object or a living being. Carrier 104, as depicted in FIG. 2 could transport a person, for example. The object may have a function while it is being transported, such as to release a substance or monitor or detect something.

Turning back to FIG. 1, cable 106 runs through control box 102. Cable 106 is suspended by posts 121 and 122. Additional posts can be incorporated as needed for sufficient support. The term "post" is used herein in a broad sense and can include, for example, natural existing structures, such as trees and rock formations, and man-made structures, such as buildings and bridges. An illustrative cable and post set-up is that which is used for ski lifts. Other set-ups that can carry a cable disposed in a loop are within the spirit and scope of the invention. Cable 106 is preferably a synthetic rope, but may comprise any material or combination of materials formed into a rope, cable, wire, etc. that is suitable for the application and environment. Cable 106 forms a loop that wraps several times around wheels 180 and 182 within control box 102 and passes through pulleys 108, 110 and 112 so carrier 104 can be drawn across an area to and from a base location 114.

Figure 3:
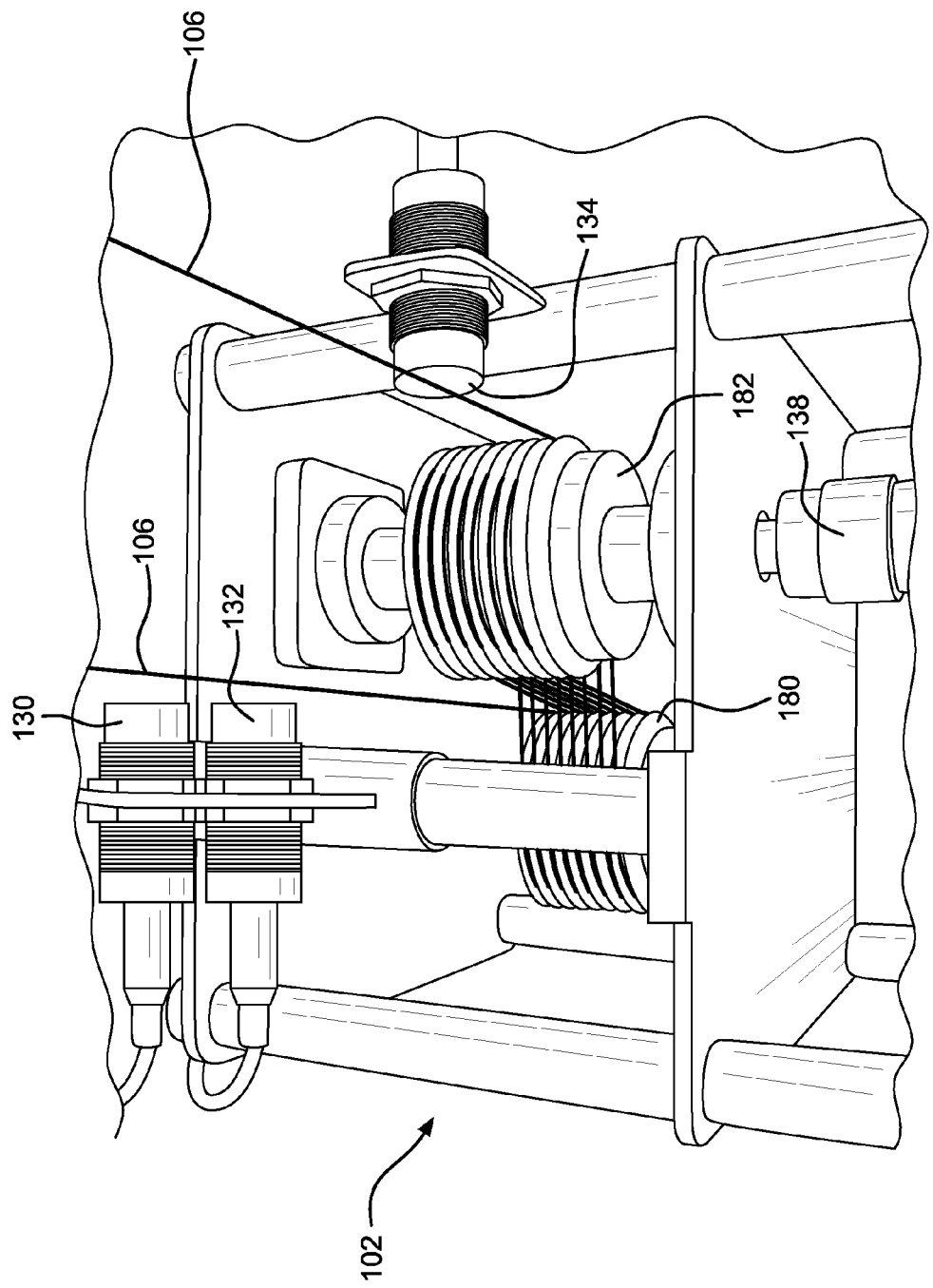
FIG. 3 depicts a control mechanism according to an illustrative embodiment of the invention.
Figure 4:
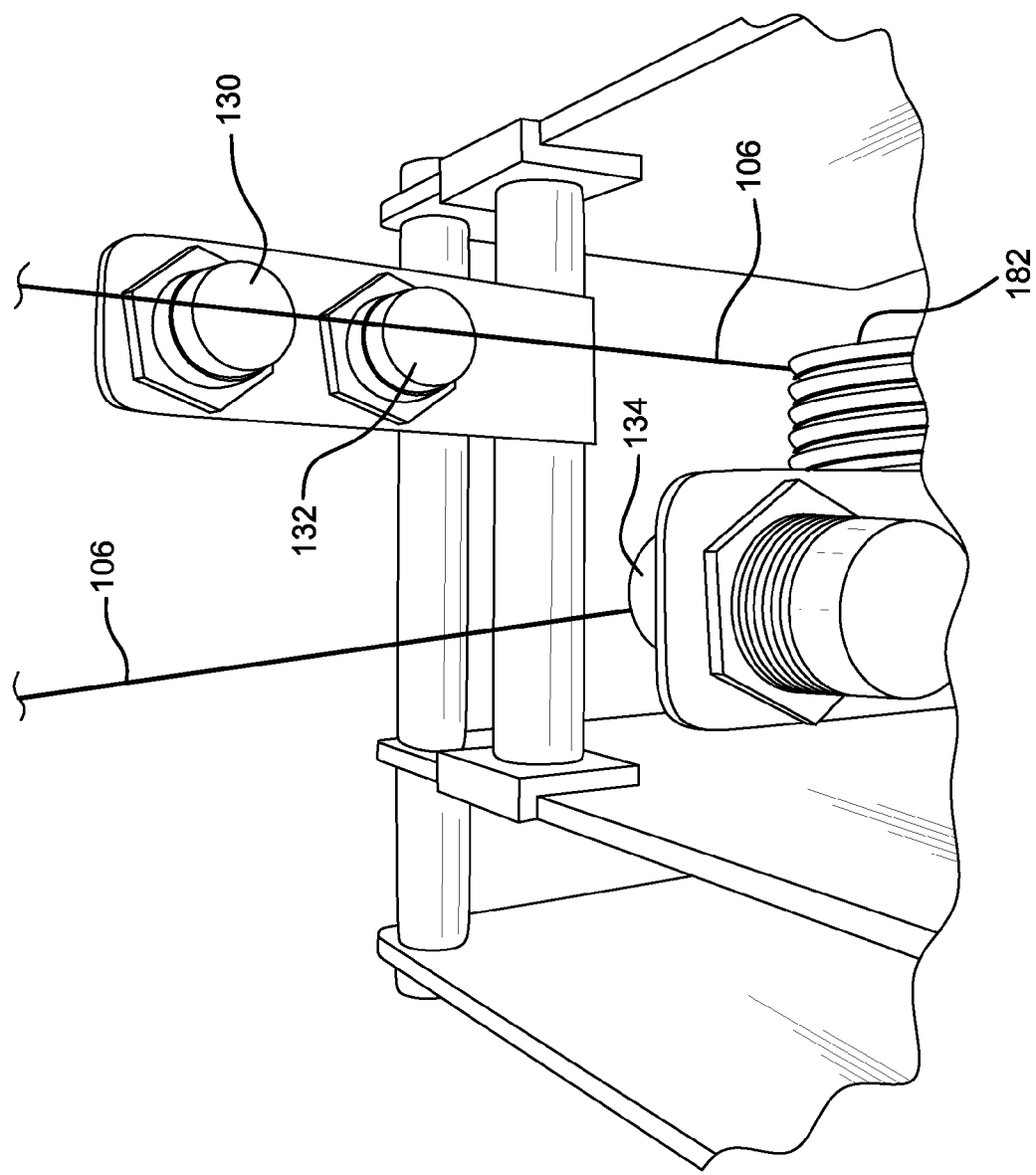
FIG. 4 depicts a second view of the control mechanism of FIG. 3 according to an illustrative embodiment of the invention.

FIGS. 3 and 4 depict two views of a control mechanism according to an illustrative embodiment of the invention. Control box 102 has three sensors 130, 132, 134 that detect three trigger points 116, 118, 120 on cable 106 (see FIG. 1). Trigger points 116, 118, 120 can be made detectable by wrapping those areas with muffler tape or the like, or anything that can trigger the sensors electrically, magnetically, optically, mechanically, etc. Trigger points 116, 118, 120 are shown in what would be considered an exaggerated manner for most trigger point components. In most instances it is advantageous to have the trigger points of cable 106 of similar dimensions to the remainder of the cable to facilitate cable 106 passing through pulleys and control box components. As cable 106 moves through control box 102 moving carrier 104 across the designated area, point 116 triggers a first sensor, which stops the motor 138 and reverses its direction to bring carrier 104 back to base location 114. Base location 114 need not be enclosed. It is noted that stopping may only be instantaneous such that the cable movement can be reversed. As carrier 104 approaches base location 114, point 118 triggers a second sensor which causes cable 106 to slow to a stop. As carrier 104 slows, it can be designed so that it re-orients itself, such as by turning around. This is accomplished by weighting the carrier in a particular manner. For example, in one embodiment of the invention, the front portion of the carrier is heavier than portions of the carrier spanning the side opposite the center of gravity. Accordingly, carrier 104 appears to back into base location 114. A third sensor in control box 102 is then triggered by point 120, which causes the motor 138 to turn on again after a designated time delay sending carrier 104 for another pass across the area. In an illustrative embodiment, solar power supply 140 is connected to control box 102 to provide solar power to motor 138.

An illustrative embodiment of the invention includes a sound or other warning device that can be triggered when, for example, the carrier reaches a particular location. The sound may also be continuous or timed to be activated at particular points in the cable's movement. In a particular embodiment of the invention, a solar powered device is used to control the sound mechanism. When the carrier is outside the base station, sunlight will charge a lithium battery associated with the device and turn it on. Other chargeable batteries are within the scope of the invention.

If the sensors are controlled by the computer in the control box, a stepper motor is necessary. Alternatively, the sensors themselves can be programmable, in which case other motor types can be used.

Although the embodiment depicted in FIG. 1 has the computer controls, sensors and wheels in control box 102, some of the components can be housed in separate boxes. The term "control mechanism" will be used to encompass a group of control components, whether they are housed in a single enclosure, more than one separate enclosure or if partially enclosed or not enclosed.

Carrier 104 can be moved at various elevations over the ground. In a particular embodiment of the invention the carrier is used to transport objects and/or people up an incline such as a mountain, and can also transport them down the incline. This can be done at various elevations from the ground. For a mountain application the elevation will likely depend on the terrain and whether other objects, people or animals must pass beneath the apparatus.

Figure 5:
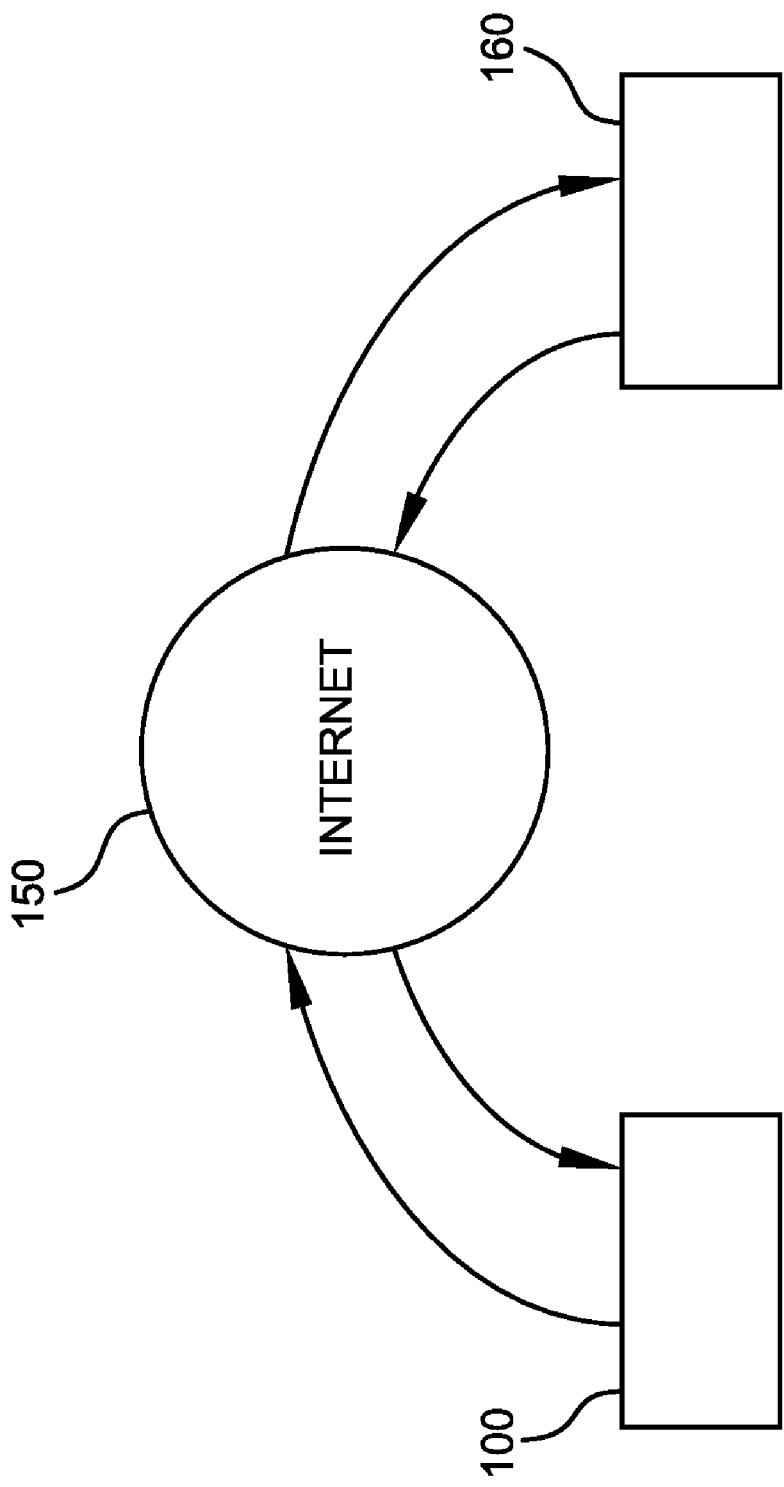
FIG. 5 depicts an Internet control system according to an illustrative embodiment of the invention.

The control mechanism may include remote controlling capabilities. FIG. 5 is a schematic of a system controllable via the Internet according to an illustrative embodiment of the invention. Apparatus 100 sends information or data via the Internet 150 to a user 160.

In an illustrative embodiment of the invention, user 160 interacts with cable control apparatus 100 via a server and client such as a computer or other communication or computational device, or a single component functioning as both a client and server. The client/server can be any hardware device that provides access to files and services. The client/server may include some or all of the following: one or more processors, one or more memory devices, such as a main memory and a read only memory (ROM), a storage device, an input device an output device, and a communication interface, and a bus. The client/server is attached to the network by some type of an interface.

Figure 6:
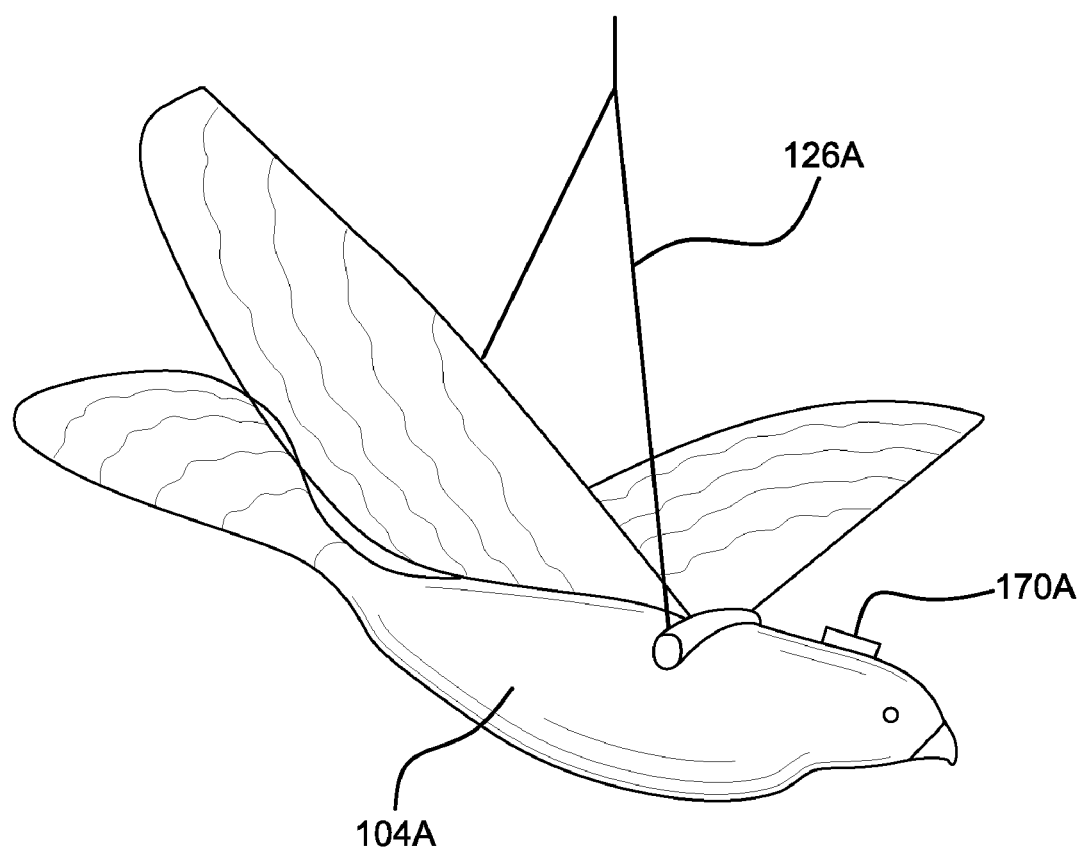
FIG. 6 depicts a carrier according to an illustrative embodiment of the invention, wherein the carrier takes the form of a predator for frightening animals.

FIG. 6 shows an alternative embodiment of the carrier, in which the carrier takes the form of predator 104A (with illustrative attachment line 126A) for frightening animals. Predator 104A mimics a predator of the unwanted wildlife and scares the unwanted wildlife from the area. In addition to the appearance of the predator form, the apparatus may include a sound mechanism to mimic auditory characteristics of the predator. The "predator" does not necessarily need to be a replica of a predator but can be any object if its movement and/or the sound generated by the system keeps unwanted wildlife from the vicinity. The term "predator" will be used herein to encompass all objects that can be used in this manner. It is likely, however, that predator forms most closely resembling the actual predators will be the most effective. In operation, the system's operation is similar with a carrier that is in the form of a predator or with a predator that is not in the form of a predator. As predator 104A slows, it is designed to turn around. This is accomplished by weighting the form in a particular manner. For example, in one embodiment of the invention, the predator is a falcon. The falcon's head portion is heavier than portions of the predator spanning the side opposite the center of gravity. Accordingly, predator 104A appears to back up.

An illustrative embodiment of the invention includes a solar powered sound device 170A such as a chip that is triggered to activate when the predator 104A is actively moving outside of its house. The sound may also be continuous or timed to be activated and need not only be activated when the predator is outside of the base location. In a particular embodiment of the invention, a solar powered device is used to control the sound mechanism. When the predator is outside its house, sunlight will charge a lithium battery associated with the device and turn it on. Other chargeable batteries are within the scope of the invention.

Predator 104A need not be moved at a significant elevation over the ground. An elevated form is appropriate for a bird, but a predator may also be a non-flying animal that would more appropriately be guided on or closer to the ground.

Remote capabilities can allow long distance control, reprogramming and trouble shooting. The control panel may be remote from the remaining components of the apparatus and operate wirelessly. A remote control panel can operate one or more cable control mechanisms. It is noted that basic remote control capabilities can be provided that do not involve the Internet, for example to remotely activate and deactivate the system, or change various parameters. The control mechanism may include remote controlling capabilities. The apparatus is unique in that it is not a stationary device and includes a novel control mechanism. While the invention has been described by illustrative embodiments, additional advantages and modifications will occur to those skilled in the art. Therefore, the invention in its broader aspects is not limited to specific details shown and described herein. Modifications, for example, to the type of object, specific configuration of the components or application of the apparatus, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A cable control apparatus comprising:
a carrier disposed on a loop of cable;
one or more trigger points disposed on the loop of cable;
a control mechanism to control movement of the loop of cable, the control mechanism comprising a plurality of sensors to sense the one or more trigger points, and a motor to impart movement to the loop of cable, wherein the sensors are functionally connected to the motor, and wherein the motor has at least two wheels about which the loop of cable is wrapped a plurality of times;
wherein a first sensor of the plurality of sensors stops the motor and reverses the direction of the cable to bring the carrier to a base location;
wherein a second sensor of the plurality of sensors stops the motor when the carrier reaches the base location; and wherein a third sensor of the plurality of sensors restarts the motor.

2. The apparatus of claim 1 wherein the second sensor slows the motor before stopping it.

3. The apparatus of claim 1 wherein the carrier is weighted in a manner that causes it to turn around when slowed or stopped.

4. The apparatus of claim 1 further comprising a sound device.

5. The apparatus of claim 4 wherein the sound device is attached to the carrier.

6. The apparatus of claim 5 wherein the sound device is solar powered.

7. The apparatus of claim 1 wherein the motor is solar powered.

8. The apparatus of claim 1 wherein one or more of the plurality of sensors is programmable.

9. The apparatus of claim 1 configured to be controlled remotely.

10. The apparatus of claim 9 remotely controlled via the Internet.

11. The apparatus of claim 10 comprising remote trouble shooting capabilities via the Internet.

12. The apparatus of claim 10 comprising reprogramming capabilities via the Internet.

13. The apparatus of claim 1, wherein each trigger part is configured for passing with the cable through all pulleys and motors in the system.

14. The apparatus of claim 1, wherein a sensor detects a trigger point by a method that does not require a slowing or stopping of the cable.

15. The apparatus of claim 1, wherein a sensor detects a trigger point by at least one of the following methods: electrically, magnetically, optically.

16. A cable control apparatus comprising:
a carrier disposed on a cable;
one or more trigger points disposed on the cable;
a control mechanism to control movement of the cable, the control mechanism comprising a plurality of sensors to sense the one or more trigger points, and a motor to impart movement to the cable, wherein the sensors are functionally connected to the motor;
wherein a first sensor of the plurality of sensors stops the motor and reverses direction of the cable to bring the carrier to a base location;
wherein a second sensor of the plurality of sensors stops the motor when the carrier reaches the base location;
wherein a third sensor of the plurality of sensors restarts the motor; and
wherein the front portion of the carrier is heavier than portions of the carrier spanning the side opposite the center of gravity so that the carrier turns around when it is slowed or stopped.

17. A cable control apparatus comprising:
a carrier disposed on a loop of cable;
one or more trigger points disposed on the loop of cable;
a control mechanism to control movement of the loop of cable, the control mechanism comprising a plurality of sensors to sense the one or more trigger points, and a motor to impart movement to the loop of cable, wherein the sensors are functionally connected to the motor, and wherein the motor has at least two wheels about which the loop of cable is wrapped a plurality of times;
wherein a first sensor of the plurality of sensors stops the motor and reverses the direction of the cable to bring the carrier to a base location;
wherein a second sensor of the plurality of sensors stops the motor when the carrier reaches the base location; and
wherein a third sensor of the plurality of sensors restarts the motor;
wherein the carrier is a predator for frightening animals.

* * * * *